(12) United States Patent
Sharma et al.

(10) Patent No.: US 12,395,415 B2
(45) Date of Patent: Aug. 19, 2025

(54) SERVICE HEALTH ASSESSMENT

(71) Applicant: Kyndryl, Inc., New York, NY (US)

(72) Inventors: Kalpesh Sharma, Bangalore (IN); Muniyandi Perumal Thevar, Madurai (IN); Shaleen Tongia, Bangalore (IN); Nalini M, Chennai (IN)

(73) Assignee: Kyndryl, Inc., New York, NY (US)

( * ) Notice: Subject to any disclaimer, the term of this patent is extended or adjusted under 35 U.S.C. 154(b) by 326 days.

(21) Appl. No.: 18/112,416

(22) Filed: Feb. 21, 2023

(65) Prior Publication Data
US 2024/0283719 A1 Aug. 22, 2024

(51) Int. Cl.
*H04L 43/0817* (2022.01)
*H04L 43/02* (2022.01)

(52) U.S. Cl.
CPC .......... *H04L 43/0817* (2013.01); *H04L 43/02* (2013.01)

(58) Field of Classification Search
None
See application file for complete search history.

(56) References Cited

U.S. PATENT DOCUMENTS

| | | | |
|---|---|---|---|
| 11,004,146 B1 * | 5/2021 | Ram | G06Q 40/03 |
| 2004/0049365 A1 | 3/2004 | Keller et al. | |
| 2004/0049372 A1 | 3/2004 | Keller | |
| 2004/0049509 A1 | 3/2004 | Keller et al. | |
| 2004/0049565 A1 | 3/2004 | Keller et al. | |
| 2009/0106844 A1 * | 4/2009 | Yoon | H04L 41/08 726/25 |
| 2013/0097183 A1 | 4/2013 | McCracken | |
| 2014/0316845 A1 | 10/2014 | Nayak et al. | |
| 2016/0117621 A1 * | 4/2016 | Allam | G06Q 10/067 717/102 |
| 2016/0239852 A1 | 8/2016 | Tanner, Jr. et al. | |
| 2016/0321574 A1 | 11/2016 | Peterson | |
| 2019/0132352 A1 | 5/2019 | Zhang et al. | |
| 2019/0171669 A1 | 6/2019 | Patankar et al. | |

(Continued)

FOREIGN PATENT DOCUMENTS

| | | |
|---|---|---|
| CN | 112487318 A | 3/2021 |
| EP | 1248178 B1 | 1/2004 |

(Continued)

OTHER PUBLICATIONS

Mohsen et al "Predictive Self-Healing of Web Services Using Health Score", Dec. 2012, Journal of Web Engineering, vol. 11, No. 1, pp. 79-91 (Year: 2012).*

(Continued)

*Primary Examiner* — Romain Jeanty
(74) *Attorney, Agent, or Firm* — CANTOR COLBURN LLP; Erik Swanson

(57) ABSTRACT

A computer-implemented method, in accordance with one embodiment, includes receiving a taxonomy specifying entities of a business service and levels of said entities. Time series data about the entities is collected and stored. Impactor propagation paths between entities is identified. A territory of a health impact of each entity is also identified. A health score for each of the entities, considering impacts on a health of the entity by at least one other entity, is computed based on the data, the propagation paths, and the territories of the entities. At least one of the health scores is output.

17 Claims, 15 Drawing Sheets

(56) References Cited

U.S. PATENT DOCUMENTS

2020/0127910 A1* 4/2020 Hamzeh .................. H04L 41/22
2023/0153736 A1* 5/2023 Turi ................ G06Q 10/06393
                                                                705/7.39

FOREIGN PATENT DOCUMENTS

WO       WO-9808581 A1 *  3/1998    ............. A63F 13/85
WO       WO-2014188480 A1 * 11/2014    ......... G06F 19/3475

OTHER PUBLICATIONS

Jahanbanifar et al., "Resolving Inconsistencies of Runtime Configuration Changes Through Change Propagation and Adjustments," arXiv, 2022, 29 pages, retrieved from https://arxiv.org/abs/2208.13891.

Peng et al., "Influence analysis in social networks: A survey," Journal of Network and Computer Applications, vol. 106, Mar. 15, 2018, 11 pages (Abstract Only).

* cited by examiner

| Entity | | Level | Path | |
|---|---|---|---|---|
| | 1 Region | 2 | 1 | 5,3 |
| | 2 Cluster | 3 | 2 | 5,1 |
| | 3 Provider | 1 | 3 | 5,2 |
| | 4 VM | 4 | | |
| | 5 Application | 5 | | |
| Edges | | | | |
| | 1 3,1 | | | |
| | 2 1,2 | | | |
| | 3 2,4 | | | |
| | 4 4,5 | | | |

```
Entity Examples -- node is a common term??
[{"entity_id":"1","entity_name":"us-north","entity_type":"region","active":"Y","attributes":{},"health_score":"","influencer_score":"<<defined from admin screen>>","level":"2"},
{"entity_id":"2","entity_name":"stage-mcmp-discovery-dal","entity_type":"cluster","active":"Y","attributes":{},"health_score":"","influencer_score":"<<defined from admin screen>>","level":"1"},
{"entity_id":"3","entity_name":"aws","entity_type":"provider","active":"Y","attributes":{},"health_score":"","influencer_score":"<<defined from admin screen>>","level":"1"},
{"entity_id":"4","entity_name":"fe-ldap-server","entity_type":"vm","active":"Y","attributes":{},"health_score":"","influencer_score":"<<defined from admin screen>>","level":"4"},
{"entity_id":"5","entity_name":"mcmp-aiops-health","entity_type":"application","active":"Y","attributes":{},"health_score":"","influencer_score":"<<defined from admin screen>>","level":"4"},
{"entity_id":"6","entity_name":"seint1234","entity_type":"compute","active":"Y","attributes":{},"health_score":"","influencer_score":"<<defined from admin screen>>","level":""}]

edge Examples
{"edge_id":"1","edge_name":"C1","edge_type":"","active":"Y","start_entity_id":"3","end_entity_id":"1","level":"1","health_score":"","influencer_score":""},
{"edge_id":"2","edge_name":"C2","edge_type":"","active":"Y","start_entity_id":"1","end_entity_id":"2","level":"2","health_score":"","influencer_score":""},
{"edge_id":"3","edge_name":"C3","edge_type":"","active":"Y","start_entity_id":"2","end_entity_id":"4","level":"3","health_score":"","influencer_score":""},
{"edge_id":"4","edge_name":"C4","edge_type":"","active":"Y","start_entity_id":"4","end_entity_id":"5","level":"4","health_score":"","influencer_score":""},
{"edge_id":"5","edge_name":"C5","edge_type":"","active":"Y","start_entity_id":"5","end_entity_id":"6","level":"4","health_score":"","influencer_score":""} routes Examples
{"path_id":"1","path_name":"app_provider","path_type":"","active":"Y","start_entity_id":"","end_entity_id":"5","edge_sequences":{"1":"4","2":"3","3":"2","4":"1"},"health_score":""},
{"path_id":"2","path_name":"app_region","path_type":"","active":"Y","start_entity_id":"5","end_entity_id":"1","edge_sequences":{"1":"4","2":"3","3":"2"},"health_score":""},
{"path_id":"3","path_name":"app_cluster","path_type":"","active":"Y","start_entity_id":"5","end_entity_id":"2","edge_sequences":{"1":"4","2":"3"},"health_score":""} influencer path Examples
{"path_id":"1","path_name":"app_provider","path_type":"","active":"Y","start_entity_id":"5","end_entity_id":"3","edge_sequences":{"1":"4","2":"3","3":"2","4":"1"},"health_score":""},
{"path_id":"2","path_name":"app_region","path_type":"","active":"Y","start_entity_id":"5","end_entity_id":"1","edge_sequences":{"1":"4","2":"3","3":"2"},"health_score":""},
{"path_id":"3","path_name":"app_cluster","path_type":"","active":"Y","start_entity_id":"5","end_entity_id":"2","edge_sequences":{"1":"4","2":"3"},"health_score":""}
```

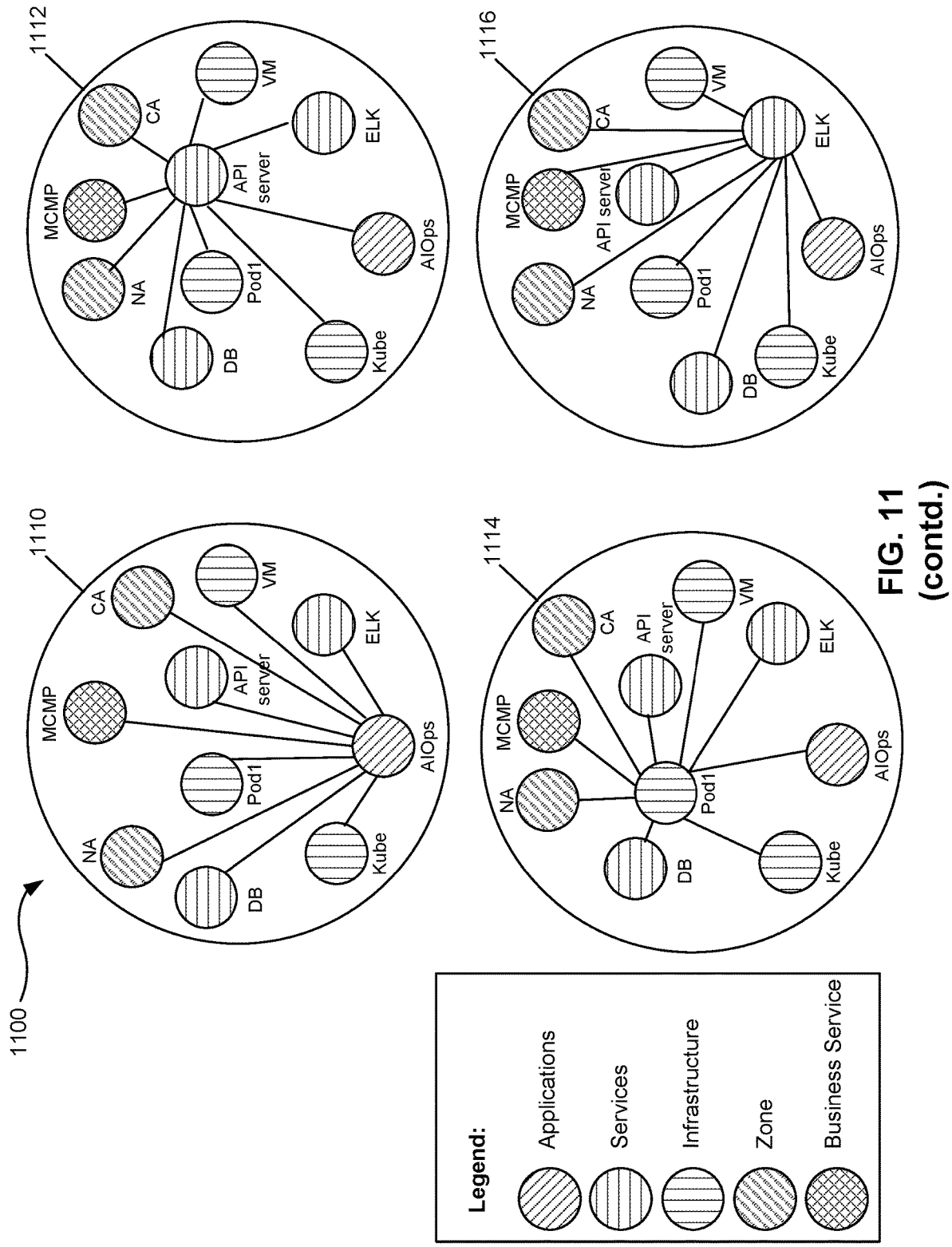
FIG. 11 (contd.)

SERVICE HEALTH ASSESSMENT

BACKGROUND

The present invention relates to assessing the health of a service, and more specifically, this invention relates to assessing the health of a business service using a propagation model of its entities and impactor attributes.

A distributed system typically includes a components that are located on distributed computers connected with one another, e.g., via one or more networks. A business service may run on a distributed system, in which various entities of the service are located on remote computers.

SUMMARY

A computer-implemented method, in accordance with one embodiment, includes receiving a taxonomy specifying entities of a business service and levels of said entities. Time series data about the entities is collected and stored. Impactor propagation paths between entities are identified. A territory of a health impact of each entity is also identified. A health score for each of the entities, considering impacts on a health of the entity by at least one other entity, is computed based on the data, the propagation paths, and the territories of the entities. At least one of the health scores is output.

A computer program product for determining at least one health score for a business service, in accordance with one embodiment, includes a computer readable storage medium having program instructions embodied therewith, the program instructions executable by a computer to cause the computer to perform the foregoing method.

A system for determining at least one health score for a business service, in accordance with one embodiment, includes a hardware processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a representation of an exemplary data model that may be output by the propagation model, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for deriving the health of a business service using a propagation model of its entities and impactor attributes.

In one general embodiment, a computer-implemented method includes receiving a taxonomy specifying entities of a business service and levels of said entities. Time series data about the entities is collected and stored. Impactor propagation paths between entities are identified. A territory of a health impact of each entity is also identified. A health score for each of the entities, considering impacts on a health of the entity by at least one other entity, is computed based on the data, the propagation paths, and the territories of the entities. At least one of the health scores is output.

In another general embodiment, a computer program product for determining at least one health score for a business service includes a computer readable storage medium having program instructions embodied therewith, the program instructions executable by a computer to cause the computer to perform the foregoing method.

In another general embodiment, a system for determining at least one health score for a business service includes a hardware processor and logic integrated with the processor, executable by the processor, or integrated with and executable by the processor. The logic is configured to perform the foregoing method.

Figure 1:
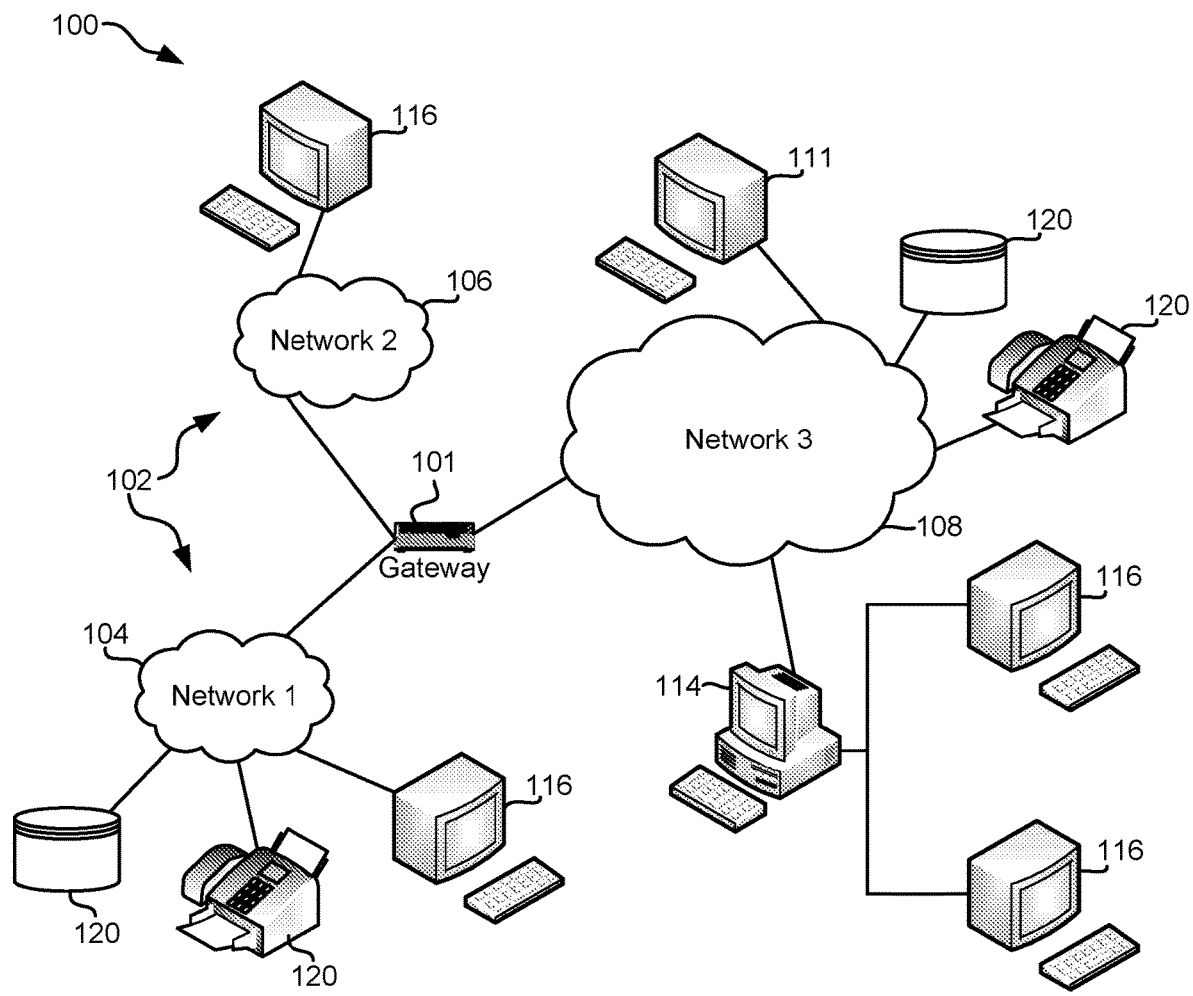
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
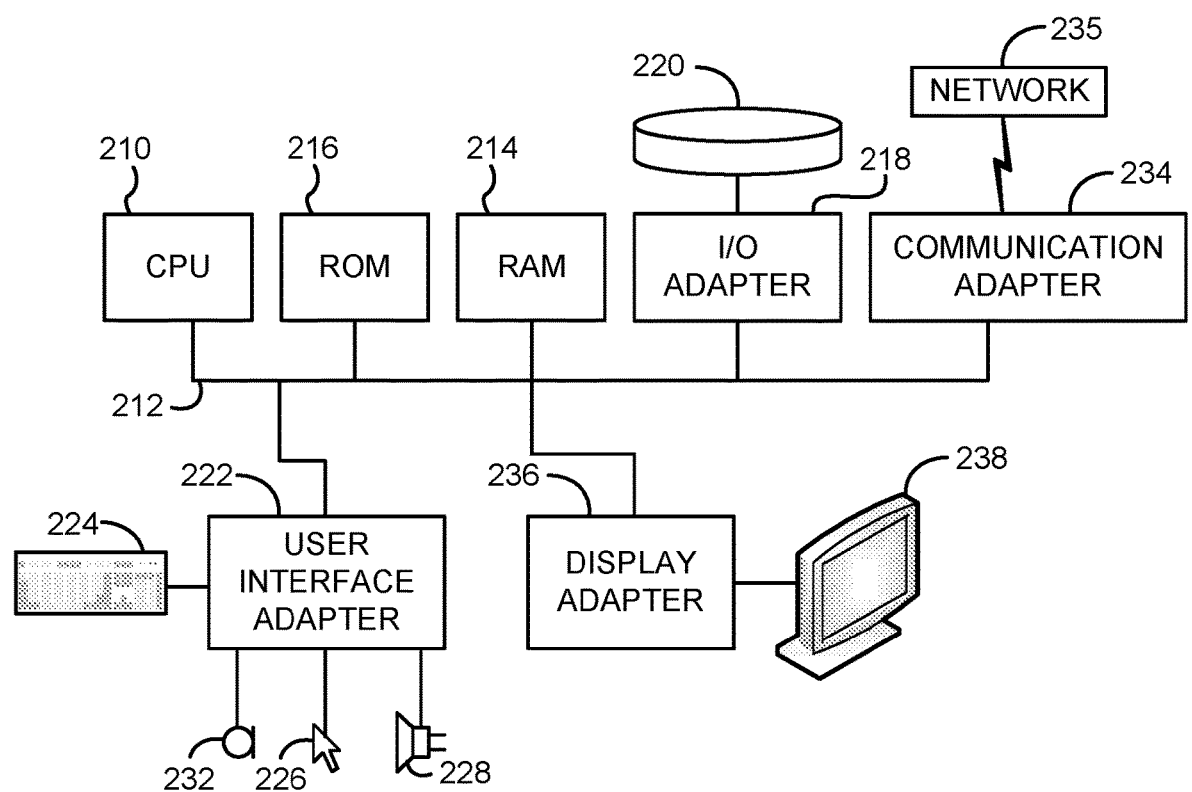
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using extensible Markup Language (XML), C, and/or C++ language, or other programming languages, along with an object-oriented programming methodology. Object-oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Many modern applications are distributed, micro-serviced, and broken in multiple modules to utilize the power of cloud computing and a distributed system. However, it has proven difficult to identify how to determine the overall service health (e.g., availability, performance, and health) of such applications. For example, the overall health of the system is not dependent on only one resource (e.g., inventory resource), one service which is used in the application (e.g., database), one network zone (e.g., deployment zone), cloud provider (e.g., where a piece of application is deployed), micro services (e.g., application logic), dependent services on which the application is dependent (e.g., payment gateway) and many other aspects. Rather, the service health of a distributed application is dependent upon a plethora of aspects such as those listed above, as well as the outcome of multiple parameters.

Unfortunately, no solutions have heretofore been available to analyse the plethora of interdependencies between distributed portions of a distributed application, nor properly consider the impact of impactors on such distributed portions. This is likely due to the inherent complexity of such distributed applications and their many impactors, the inability in the state of the art to collect the proper information, and the inherent difficulties in creating a processing technique to perform the intense computing required to perform an accurate service health assessment. Rather, previous attempts at determining a health of a business service were prone to adding invalid components, as well as not considering important components.

What is needed is a technique to perform an accurate business service health assessment for a distributed application.

As noted above, no solutions have heretofore been available to accurately derive the health of a business service. This is likely due to the inherent complexity of such distributed applications and their many impactors, the inability in the state of the art to collect the proper information, and the inherent difficulties in creating a processing technique to perform the intense computing required to perform an accurate service health assessment. For example, previous attempts to gauge the health of a business service were unaware of the many dependencies of the business service, and thus could not use that information to define if a portion of the service is critical, a major portion of an application is critical, or the entire application is critical.

Described herein is a methodology for deriving the health of a business service. For the first time, business service health is accurately estimated, thereby enabling assessment of the possibility of an application or associated system going down, detection of other major problem in the system, etc. This in turn allows operators to mitigate risks, pull resources to problematic areas before errors become too severe, and ensure that the portions of the applications running on a particular computer are functioning properly thereby improving operation of the computer. A peripheral benefit is that the improved stability helps users to reduce costs by enabling pre-emption of problems.

Various embodiments described herein are able to assess the health of a business service to provide the health of any business applications or services running on any client platform. Health of any business application can be viewed/drilled down into different layers, e.g., based on the taxonomy defined by the client, such as drilling down from region to individual resources.

Preferred embodiments use a pipelined approach to determine business service health, as described in more detail below. Such a pipeline may have configurations defined based on client requirements. Accordingly, configurations related to taxonomy, data ingestion, adaptors, discovery, analytics, machine learning, visualizations, etc. are stored in a pipeline layer in some approaches, as described in more detail below.

In general, a business service includes a composition of various applications, and their functionality, that together achieve a particular business objective for a client. For example, a banking business service for a bank (client) may have an application for logging users in, an application to show balances, an application to retrieve documents, and so on. When a user goes to the banking service user interface, these components of the banking solution are available. Thus, a business service includes more than a single application, e.g., more than a login application, and perhaps requires more than a single computing device. Moreover, a business service may include logical and/or physical components available in the client's infrastructure. Accordingly, a business service is the compilation of applications whose functionality provide the business service, and in some aspects, the logical and/or physical components associated with those applications.

Figure 3:
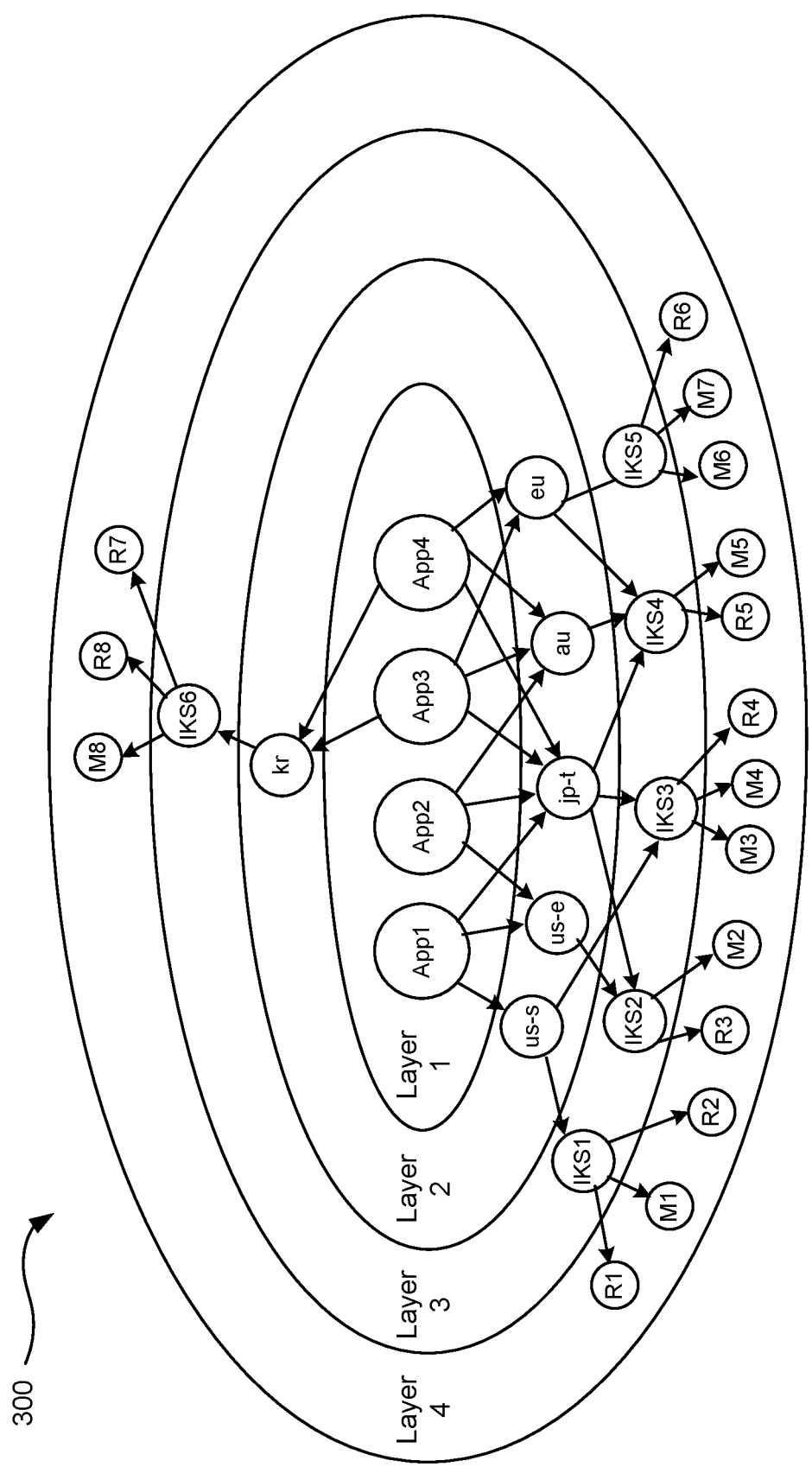
FIG. 3 is a conceptual diagram depicting an exemplary logical mapping of a business service for a single client, which can be constructed in accordance with various embodiments.

For context, FIG. 3 is a conceptual diagram depicting an exemplary logical mapping 300 of a business service for a single client, which can be constructed in accordance with various embodiments. It should be kept in mind that a logical mapping is unique to each deployment, e.g., for each client providing the business service, and the depiction in FIG. 3 is presented by way of example only.

The logical mapping 300 may be implemented in accordance with the present invention in any of the environments depicted in the other FIGS., among others, in various embodiments. Of course, more or fewer layers, entities, etc. than those specifically described in FIG. 3 may be included, as would be understood by one of skill in the art upon reading the present descriptions.

As shown, the mapping includes several layers, with entities on each layer. The elements in each level are called entities, and correspond to applications, infrastructure (e.g., hardware), logic, and any other relevant component of the overall business service.

With continued reference to FIG. 3, the mapping 300 includes a business services layer (Layer 1), which includes several applications, App1 to App4, that provide the business service in conjunction with entities in other layers.

Each application has many dependencies to entities (impactors) in other layers. Moreover, various entities affect more than one application. Accordingly, various aspects of the present invention assess not only what is happening on the computer(s) running the applications in the business service layer, but also considers the health of the entities from other layers and the impact of that health on the applications in the business service layer.

Layer 2 is a location layer, and includes entities (US-south, US-east, and so on) corresponding to the locations where the business service is offered.

Layer 3 is an environment layer having several entities corresponding to different technical environments associated with the business service, such as security, logging, etc.

Layer 4 is a resources and metrics layer that includes entities for most or all of the resources used by the business service, as well as corresponding metrics for each resource.

The logical mapping 300 thus provides correlations among all of the entities across the different layers. The correlations can in turn be used to determine the effect that one entity has on other entities as well as the overall health of the business service.

The logical mapping 300 is preferably constructed by scanning through the existing infrastructure associated with the business service. Which infrastructure to scan through may be based, at least in part, on the configurations of the applications in the business service layer.

Likewise, the selection of which layers to add to the mapping may be based on parameters defined for the particular business service, e.g., what the client provides using the business service.

Figure 4:
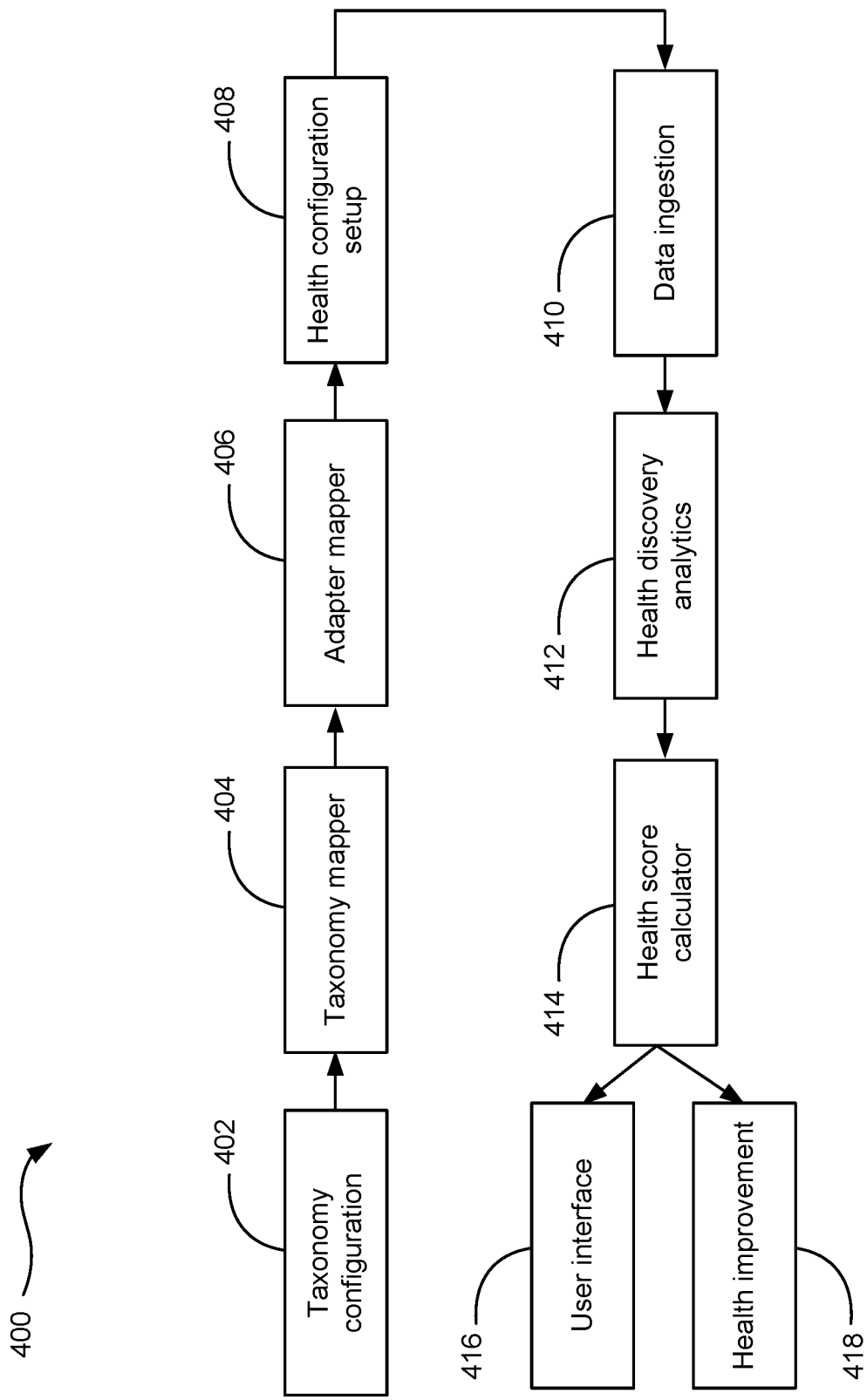
FIG. 4 is a depiction of a business services health assessment pipeline architecture, in accordance with one embodiment.

Now referring to FIG. 4, a representation of a business services health assessment pipeline architecture 400 is shown according to one embodiment. The architecture 400 may be implemented in accordance with the present invention in any of the environments depicted in FIGS. 1-3, among others, in various embodiments. Of course, more or fewer operations, components, data sources, and outputs than those specifically described in FIG. 4 may be included, as would be understood by one of skill in the art upon reading the present descriptions.

Various components of the architecture 400 of FIG. 4 may be performed by any suitable component of the operating environment. For example, in various embodiments, the architecture 400 may be partially or entirely implemented in a computer, or some other device having one or more processors therein. The processor, e.g., processing circuit(s), chip(s), and/or module(s) implemented in hardware and/or software, and preferably having at least one hardware component may be utilized in any device to perform one or more steps depicted in FIG. 4. Illustrative processors include, but are not limited to, a central processing unit (CPU), an application specific integrated circuit (ASIC), a field programmable gate array (FPGA), etc., combinations thereof, or any other suitable computing device known in the art.

In general, the business service pipeline architecture 400 includes modules to define structure, prepare information, process the information, analyze interconnections and the associated effects of entities on other entities and applications, and predict and report the health of the service. The business service pipeline architecture 400 is generic in that it may be used for business services running in full or in part on a public cloud, a private cloud, a hybrid cloud, and/or on premises.

The infrastructure of each client varies, and it can include on-premises, cloud and/or hybrid components. The first part of the process is to define the taxonomy of the business service. Accordingly, a taxonomy configuration module 402 may be used to define the taxonomy of the business service, including the levels to be mapped, e.g., as in the logical mapping represented in FIG. 3. The taxonomy can include any one of the possible permutations of the infrastructure elements available.

Preferably, a client administrator defines the different levels of the business service taxonomy structure, what the entities of the business service are, and which level each entity belongs to, e.g., via a dashboard of the taxonomy configuration module 402. For example, once the tenant has decided on what business service they want to calculate the health score for, they can interface with the administrator dashboard to set up the details of the business service.

In one example for a hybrid cloud, the levels may be defined by the taxonomy configuration module 402 as follows:
Level 1: Region
Level 2: Environment
Level 3: Clusters
Level 4: Applications
Level 5: Subsystems The associations and impactors (influencers) between the levels may also be configured using the taxonomy configuration module 402.

The topology Application Program Interfaces (APIs), DevOps/Platform APIs, etc. may be used to provide the details related to the entities set up in the client infrastructure. The administrator creates different entity levels of taxonomy and maps the required entities into it. Each entity may have a list of attributes and each attribute may have a list of available metrics.

The client administrator also preferably chooses all the metrics to be collected, sets the priority and weightage noted below based on the business requirements, and sets the entity levels. The client administrator also preferably chooses the data source(s) for each of the entities. The data source will provide time series data associated with the entity attributes.

The client administrator also preferably chooses the health score/impactor score calculation algorithm rules for each entity. The health score calculations may be specific to entity levels.

In other approaches, the levels may be derived based on characteristics of entities associated with the applications. Note that for each application, the taxonomy levels configuration may be dynamic.

In a preferred approach, the levels are defined according to the client who is offering the business service, defined according to the configuration of the business service, etc.

In one exemplary sequence for defining the taxonomy, the client administrator defines the level-based details, e.g., application level, environment level, region level, etc. The entities of the business service are listed and associated with their respective levels. For each entity, attributes (metrics) are defined, and the impactors from different attributes are chosen. Exemplary attributes/metrics include CPU utilization, memory utilization, available storage, etc. The administrator preferably assigns weightage to each attribute/metric. The administrator also defines rules such as key performance indicators (KPIs) for scoring logic for each attribute chosen as an impactor. For example, scoring logic may include rules such as CPU utilization >90% (score 90)—Red, memory utilization <10% (score 10)—green. This score is for each entity and not the edges. The health interpretation for scoring may be an edge.

Using the taxonomy input by the administrator, source and target details are extracted from the level grouping data. Source, target, and impactors details are used to construct a network graph. See description of module 404 below. After setting the topology for each node and impactors, data can be collected. See description of submodules 406-410 below. A job may be run, or data streams accessed to collect the metrics data for each impactor defined in the topology. See description of submodules 406-410 below. Rules are applied to the impactors. The rules are applied to get the health of the entities in the topology and assign weightage to the entities. See description of submodules 412-414 below.

As noted above, preferably the client defines the taxonomy that specifies the entities and their levels. A taxonomy mapper module 404 analyzes the various entities, e.g., applications, logic, hardware, etc. and their respective designated levels, to create a logical mapping, e.g., of type shown in FIG. 3. Any technique that would become apparent to one skilled in the art to perform such mapping may be used.

An adapter mapper module 406 specifies the adapters that will be used to collect data from each entity in the logical mapping. For example, the adapter mapper module 406 may map the available adapters to the entities of the business service so that the proper information about the entities is received. In general, any type of adapter that can collect the requisite information from and/or about a given entity may be used. Illustrative adapters include monitoring adapters, container services, platform services, storage services, logstash adapters, application program interfaces (APIs), third party adapters, etc.

A health configuration setup module 408 defines the data that will be used to determine the health of each note in the logical mapping. The health configuration setup module 408 may also specify what kind of health is determined for each and every entity.

A data ingestion module 410 uses the adapters to pull the data defined by module 408 from the various entities in each level from the taxonomy for analytics. The data can be any relevant data that can be used in a health assessment, such as logs, performance metrics (such as CPU usage, memory usage, etc. metrics), platform/DevOps related metrics, error logs, warnings, etc. Preferably, the data is gathered in real time, for enabling an ongoing health assessment. In some approaches, customized adaptors may be used to pull the required time series data in raw format.

The time series data is stored. Preferably, the data is stored in a data lake. A data lake is a system or repository of data stored in its natural or raw format. The data lake may be stored on a data storage medium. Preferably, raw time series data is stored in the data lake for each of the taxonomy levels.

Preferably, the adapters ingest only the data required for the health assessment for storage in the data lake. Note also that the input schema for monitoring, metrics, logs, and subsystem may be different based on client requirements.

The data lake thus includes the information, from all of the layers, to enable machine learning analytics on the data.

A health discovery analytics module 412 performs analytics and machine learning (ML) processing on the data gathered by the data ingestion module 410, e.g., on the raw data and/or equivalently on derivatives of such data.

Preferably, the health discovery analytics module 412 performs analytics and ML processing on normalized data from the data lake to process the data from the data lake for various purposes. For example, the time series data in the data lake may be transformed into normalized data to improve analytics and machine learning (ML) processing. Any known technique to normalize data may be used. In one approach, the data output format is common for all adapters. In another approach, the data in the data lake is normalized and constructed into a specific common format for the analytics and/or machine learning modules.

One purpose may be to identify impactor propagation paths between entities, where an impactor propagation path generally corresponds to a logical connection between two entities where the health of one impactor entity impacts the health of another entity. In one approach, identification of at least some of the impactor propagation paths are derived from data sharing between entities. In another approach, identification of at least some of the impactor propagation paths is achieved by drilling down through system data. In another approach, identification of at least some of the impactor propagation paths is derived from configuration files associated with the application. In a further approach, identification of at least some of the impactor propagation paths is derived via discovery of infrastructure associated with the application.

See the section entitled "Method to identify impactor propagation path of business service health using single entity or multiple entities or entity attribute or combination of multiple attributes" below for examples of identification of impactor propagation paths.

Another purpose may be to identify the 'territory' of business service entity health using a topology propagation model and deriving and learning territory models of various impactors. The territory represents the impact of the health one entity has on the health of other entities in the overall business service structure, e.g., the territory corresponds to a collection of entities whose health is impacted by the entity (impactor). Any technique known in the art that would become apparent to one skilled in the art after reading the present disclosure may be adapted in a manner that would also become apparent to one skilled in the art after reading the present disclosure for use in identifying the territory.

See the section entitled "Identify the territory of business service entity health using topology propagation model and deriving and learning territory models of various impactors" below for nonlimiting examples.

The health discovery analytics module 412 also performs analytics and machine learning (ML) processing on the normalized data from the data lake to process the data from the data lake to enable calculation of the health for, preferably, each and every entity based on the configuration set up in the pipeline of architecture 400.

The health discovery analytics module 412 may include various submodules for performing analytics and machine learning processing. Any analytics and/or ML technique known in the art may be used in the health discovery analytics module 412, e.g., in various submodules thereof. Illustrative submodules include a machine learning submodule, a data discovery submodule, a health score calculator submodule, an anomaly detector submodule, a health trends calculator submodule, a predictive analyzer submodule, a historical analyzer submodule, and a health reporting service submodule. These submodules may be of conventional design, but modified and/or specifically trained/configured for use in the health discovery analytics module 412 to process information of the type listed herein for generating appropriate output usable in the pipeline of architecture 400 to generate outputs noted herein, as would become apparent to one skilled in the art after reading the present disclosure.

The output of the health discovery analytics module 412 includes information usable to calculate health scores for some or all of the entities. Such information may include environment, region, provider, stores, resources, applications, batch jobs, pipelines, reporting, services, etc. Preferably, the health discovery analytics module 412 transforms the information in the data lake into a normalized health value for each and every entity in all layers.

Note that one or more of the submodules noted above may be deployed in a trained state of a trained Artificial Intelligence (AI) model. Training of the AI model, in some approaches, may be performed by applying a predetermined training data set to learn how to process the data from the data lake. Initial training may include reward feedback that may in some approaches be implemented using a subject matter expert (SME) that understands how the data from the data lake should be processed with respect to the training data. In another approach, the reward feedback may be implemented using techniques for training a BERT model, as would become apparent to one skilled in the art after reading the present disclosure. Once a determination is made that the AI model has achieved a redeemed threshold of accuracy during this training, a decision that the model is trained and ready to deploy for use in the health discovery analytics module 412 is made.

A health score calculator module 414 uses the output of the health discovery analytics module 412 to calculate a health score for, preferably, each and every entity in the mapping.

To find the health score of an entity, the branch level entity metrics data may be considered for calculation. If there is no branch, then individual entity scoring may be performed. Preferably, each entity in the branch has a predefined priority and/or predefined weights, e.g., defined by the client.

Figure 9:
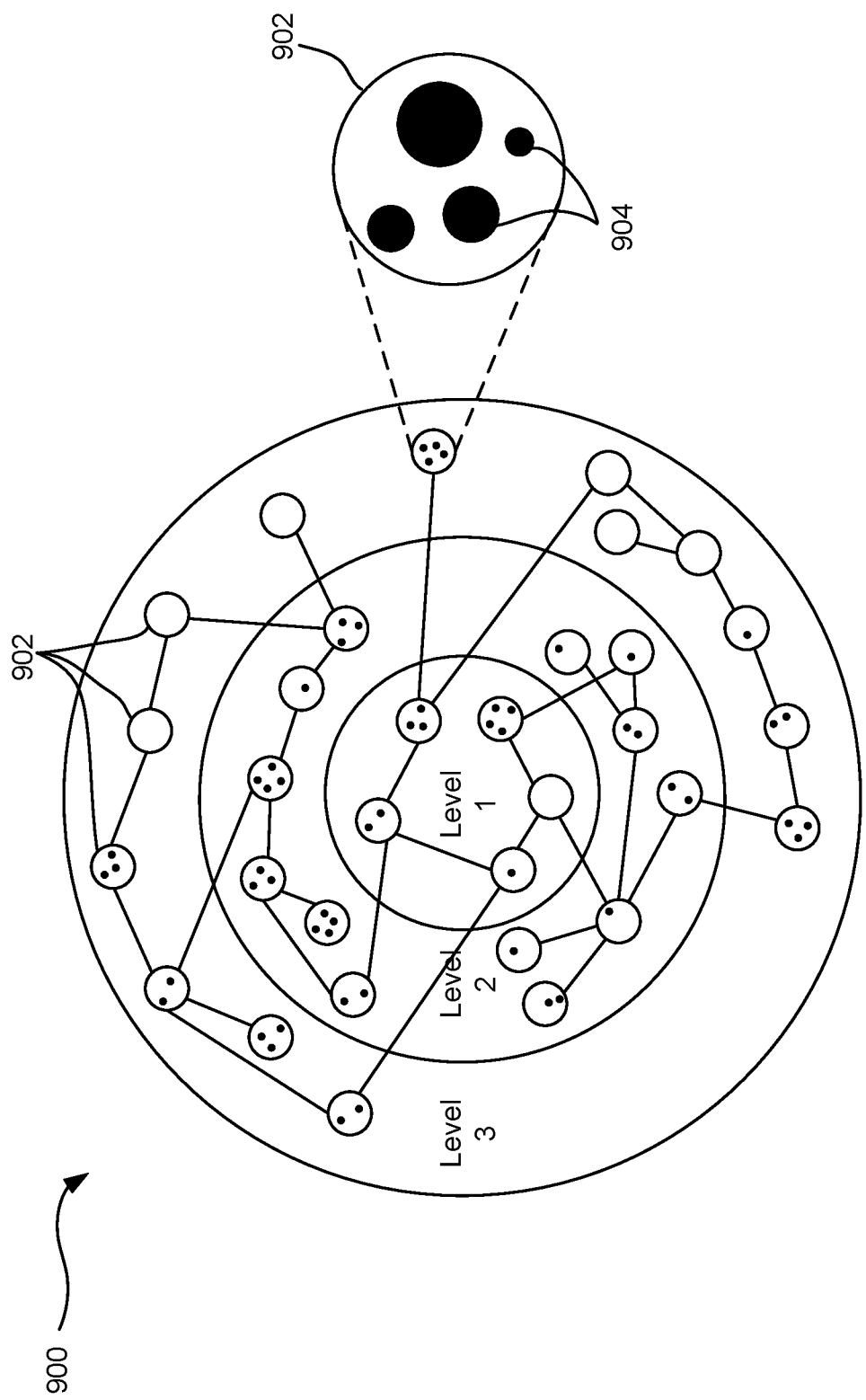
FIG. 9 is a diagram illustrating different levels of a business service application (Level 1, Level 2, Level 3) as well as the entities and their attributes, in accordance with one embodiment.

FIG. 9 is a diagram 900 illustrating different levels of a business service application (Level 1, Level 2, Level 3) as well as the entities and their attributes. Small and big circles in the entity 902 represents the weightage (e.g., impactors priority) of each attribute 904 inside each entity. For example, assume VM is the entity and CPU utilization, memory utilization, available storage are the attributes. Initially the weightage is set by the administrator, and during the learning process, the inventive system will identify the range of impactor attributes (e.g., high to low).

The weighted average (e.g., of metrics and/or key performance indicator (KPI) data) for all entities with paths to an entity in the next level up may be retrieved and/or calculated to find the score of the entity in the next level up.

The root entity health score (e.g., of an application in the top level) may be a weighted average of the health scores of all branch entities having a path thereto.

In preferred embodiments, the health scores of every entity in the mapping are calculated, as well as an overall health score for the business service itself.

See the section "Algorithm for calculating the health score" below for exemplary techniques for calculating health scores.

The resultant health score(s), or information derived therefrom, are output. For example, the root entity health score may be output to a user interface module 416. Moreover, all health scores for a single application or multiple applications, e.g., from root to leaf entity may be output.

Preferably, the health scores are normalized, thereby allowing direct comparison of the relative health of the entities to one another.

In one approach, the health score is stored in a health index as a time series data. This health score data may in turn be used for prediction and anomaly detection by machine learning modules according to known techniques.

A health improvement module 418 may detect an unhealthy entity based on the output health scores, and initiate a process for improving a health of the unhealthy entity. An entity may be determined to be unhealthy based on any criteria that would become apparent to one skilled in the art upon reading the present disclosure. For example, such determination may be made in view of the health score thereof being below a predefined threshold, based on predetermined criteria, based on the health score thereof being a lowest score, etc.

Any process to improve the health of an entity that would become apparent to one skilled in the art after reading the present disclosure may be used. Illustrative processes to improve the health of an entity may include initiating an automated repair program, outputting an electronic alert noting the unhealthy state of the entity, initiating a diagnostic program, etc.

Method to Identify Impactor Propagation Path of Business Service Health Using Single Entity or Multiple Entities or Entity Attribute or Combination of Multiple Attributes The taxonomy of the business service can be thought of as a graph. Each entity in the graph represents a node in the graph. Everything is connected and each entity is contributing to the overall health of the system. Accordingly, identifying the health propagation path of each entity to the overall health of the system is very important. Once the paths between entities are known, the system can define the territory of the entity that will help with any impactor analysis.

During the learning process of the propagation of the impactor, the limitation of each attribute of the entity to the overall health of the system can be derived. One entity may have a direct impact on the health of the overall business service deployment. For example, high CPU utilization of the server can impact many applications running in the server, thereby impacting the overall health of the business service.

A propagation model is derived for each entity in the graph, each node in the graph is considered as an entity, and some entities may include a group of entities. The propagation model is preferably derived with respect to time using time series data corresponding to the entities. Using the propagation model, the system can predict the pattern of the impact of a particular entity over time. Use of a propagation model over time helps to predict the entity health with less error.

Figure 5:
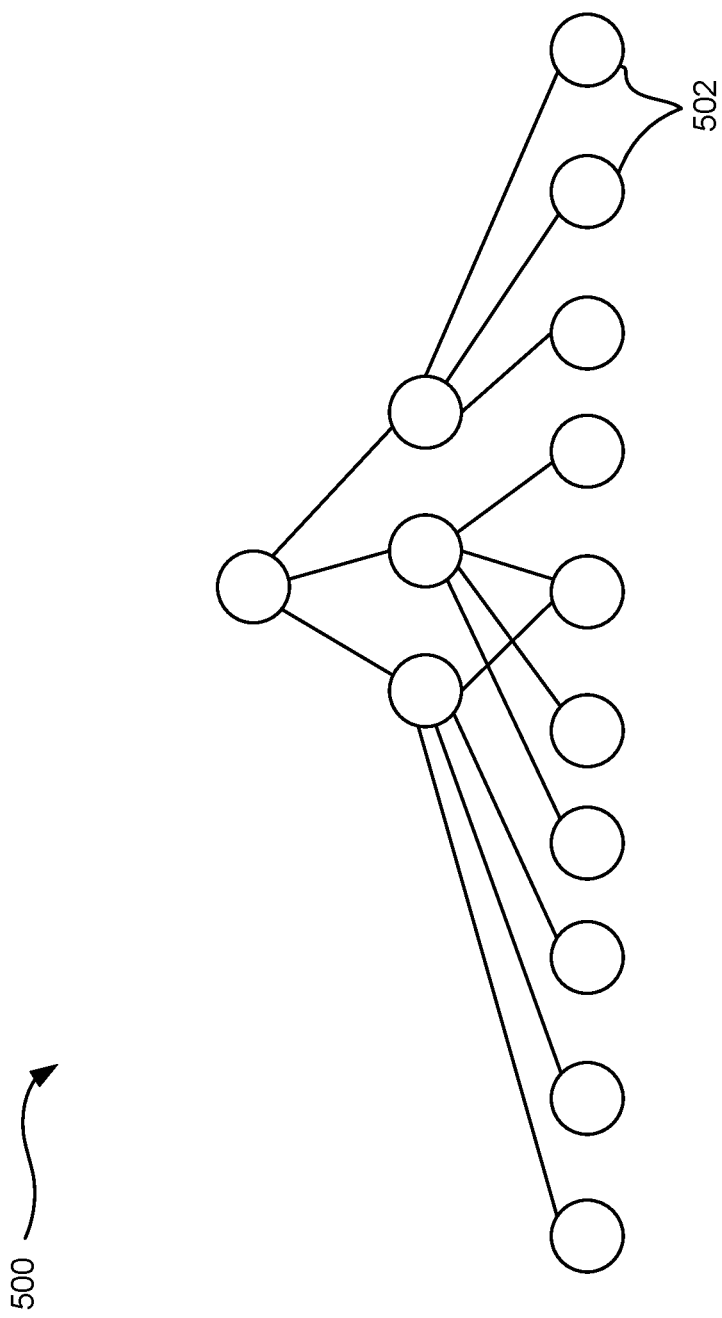
FIG. 5 is a graphical representation of entities on different levels, in accordance with one embodiment.

An impactor propagation model may be used to identify the propagation paths between entities, thereby identifying which entities are impactors on other entities. Referring to FIG. 5, which is a graphical representation 500 of entities on different levels, the entities 502 on each level are assessed for influence or connection to entities on other levels. Paths between entities that exert influence or connection to other entities are determined. Also, a determination is made as to whether the path between entities is direct (i.e., no intervening entity), or indirect, which is indicative of whether an entity affects the health of another entity directly or indirectly.

The propagation model may use any known type of machine learning or artificial intelligence (AI) base.

The propagation model may take as input information from the data lake to determine the paths.

Figure 6:
FIG. 6 is a table of exemplary output of the propagation model, in accordance with one embodiment.

FIG. 6 depicts a table 600 of exemplary output of the propagation model. As shown, the output includes each entity, the level in which the entity resides, a path information. Edges may also be represented.

FIG. 7 illustrates an exemplary data model 700 that may be output by the propagation model. The data in the data model represents the structure of the entities interconnected by the paths determined by the propagation model.

Algorithm for Calculating the Health Score

The following description provides an example for calculating a health score for an entity, group of entities, and the overall business service.

Input: X, set of independent health variables (metrics, alerts, incidents, logs) with classifications C (healthy, warning, critical) and set of M metrics $M=(m_1 \ldots m_n)$ Output: y health score of an entity.

The source of $x_i$, $y_i$, $m_i$ are:
1. Monitoring Tools such as Application Performance Monitoring (APM) tools
2. Cloud Provider APIs
3. Incident Management Tools
4. Resource Metrics $$y = \beta_0 + \beta_1 x_1 + \beta_2 x_2 + \beta_3 x_3 + \beta_4 x_4 \qquad \text{Equation 1}$$

$x_1$=metrics-based health score
$x_2$=incident-based health score
$x_3$=alerts-based health score
$x_4$=logs-metrics-based health score
Or
If y is the business service health score
$x_1$=application health score
$x_2$=region health score
$x_3$=environment health score
$x_4$=cluster health score
$x_5$=resource health score
All the coefficients give the estimated weight of each entity.
$x_i$=where i=1 to n. n represents number of independent health variables for an entity.

$$x_i = \alpha_0 + \alpha_1 m_1 + \alpha_2 m_2 + \alpha_3 m_3 + \ldots + \alpha_n C_n \qquad \text{Equation 2}$$

$m_j$ where j=1 to n. n represents different independent categories of each health variable.

$$m_j = \gamma_0 + \gamma_1 C_1 + \gamma_2 C_2 + \gamma_3 C_3 + \ldots + \gamma_n C_n \qquad \text{Equation 3}$$

$C_1$, $C_2$, $C_3$=Time series classifications of health score for a metrics for an entity.

y is health score of an entity (or any other measurable property of an entity). The entity may be a resource, environment, region, store, location or any type of property that defines the health.

x represents multiple independent variables that contribute to the health of the system. x has multiple dimensions as listed below:
- $x_i$ represents types of health scores like metric health score, incident health score, alerts health score, logs metrics health score, etc.
- $m_j$ represents the categories of each health score types, for example in metrics health score we have multiple metric types that contributes the health of any entity (e.g., resource) like CPU utilization, memory utilization, network performance, etc.
- $c_k$ represents different classification attributes of health (healthy, critical, warning etc.), or represents multiple attributes of any measurable property like performance, etc.

$\beta_i$ represents the estimated increase in health score y per unit increases in x.

$\beta_0$ represents the intercept of the health score y where there are no independent variables.

$y_i$ is the health score of any entity where i=1 to n, n represents no. of entities of any business service.

Example 1

Output: y is the health score of a resource entity eks.
Source of input Data:
$x_1 \rightarrow$ Metrics based health score
Input Metrics are below:
$m_1$—cluster_failed_node_count
$m_2$—cluster_node_count
$m_3$—namespace_number_of_running_pods
$m_4$—node_memory_limit
$m_5$—node_memory_utilization
$m_6$—node_cpu_limit
$m_7$—node_cpu_utilization
$x_1$ value is derived from multi regression model according to Equation 2.

Now the regression model of $x_1$ is known, and using that, the system can predict the health score $x_1$ and the resource entity eks using the prediction model defined in Equation 1.
$x_2 \rightarrow$ Incident-based health score
$m_1$—sev1 ticket details
$m_2$—sev2 ticket details
$m_3$—sev3 ticket details
$m_4$—sev4 ticket details
$x_2$ value is derived from multi regression model Equation 2. $x_2$ includes multiple independent severity tickets values. Using these values, the prediction model is defined using Equation 2.
Source of input Data:
$x_1 \rightarrow$ Metrics based health score
Input Metrics are below
$m_1$—cluster_failed_node_count
$m_2$—cluster_node_count
$m_3$—namespace_number_of_running_pods
$m_4$—node_memory_limit
$m_5$—node_memory_utilization
$m_6$—node_cpu_limit
$m_7$—node_cpu_utilization
$x_1$ value is derived from multi regression model Equation 2.

Now that the regression model of $x_1$ is known, the regression model of $x_1$ can be used to predict the health score $x_1$ and the resource entity eks using the prediction model defined in Equation 1.
$x_2 \rightarrow$ Incident-based health score
$m_1$—sev1 ticket details
$m_2$—sev2 ticket details
$m_3$—sev3 ticket details
$m_4$—sev4 ticket details
$x_2$ value is derived from multi regression model Equation 2. $x_2$ includes multiple independent severity tickets values. Using these values, the prediction model is defined using Equation 2.

The resource entity eks health score is predicted using metrics prediction model $x_1$ and incidents prediction model $x_2$ using multi regression model defined in Equation 1.

Example 2

Find the health score of an application. For example, the application ABC has the following resources:
1. eks
2. lambda
3. ecr
4. ecs
5. s3
6. ebs
7. rds
8. dynamodb
9. vpcs etc.

The health of each of these resources is calculated using the method defined in Example 1, and the health score of the application is modelled using Equation 1. Here each independent variable is a resource entity itself.

Method to Discover the Impactor Relationship Among Different Entities or Between Attributes in the Entities.

The first part of this section describes how to build connections between nodes. Preferably, connections are determined between each and every node (that has a connection). The connections in this section may be built without regard to which levels the entities are on.

Figure 10:
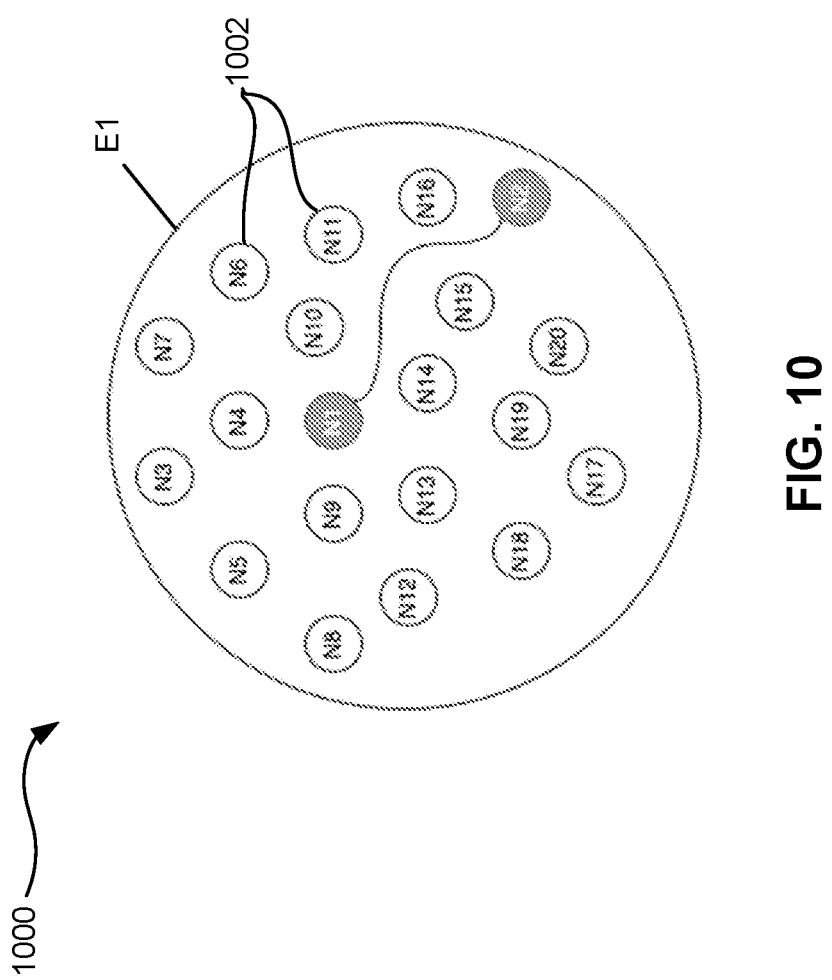
FIG. 10 is a graphical representation of a connection between nodes, in accordance with one embodiment.

For the present description, assume an entity E1 has 20 associated nodes 1002, as shown in the diagram 1000 of FIG. 10. For example, VM may be an entity having 20 associated metrics. The health score of each metric is calculated using the formula above.

Here, it is desirable to understand the following:
1. Which metrics are contributing to the health of the entity E1.
2. How the metrics are associated with each other from N1 to N20.
3. How each node in the entity is connected, as well as what the association between nodes is, and whether the association is a strong or a weak association.
4. Whether the association between nodes is real, and thus how to identify the real associations between nodes.

To identify the associations between nodes, the following algorithm may be used. The parameters include:

Input: Nodes N1 to Nn

Output: R is a real connectivity, where R is [R1 ... Rn] edges. R is between pairs of nodes or group of nodes and it has the label like nature of the connection (strong, weak).

Algorithm:
1. Loop through each node.
   a. Obtain the health score of each node.
   b. Obtain the relationship or connection between two nodes, for example node N1 and N2 and the edge is represented as (N1, N2), as represented in the below Table 1.

TABLE 1

|    | N1 | N2 | N3 | N4 | N5 |
|----|----|----|----|----|----|
| N1 | — | (N2 – N1) | (N3 – N1) | (N4 – N1) | (N5 – N1) |
| N2 | (N1 – N2) | — | (N3 – N2) | (N4 – N2) | (N5 – N2) |
| N3 | (N1 – N3) | (N2 – N3) | — | (N4 – N3) | (N5 – N3) |
| N4 | (N1 – N4) | (N2 – N4) | (N3 – N4) | — | (N5 – N4) |
| N5 | (N1 – N5) | (N2 – N5) | (N3 – N5) | (N4 – N5) | — |

2. The time series matrix is generated, and the score values are accumulated. The mean value is generated on each cell.
3. The difference between the health score of each combination of nodes is found, for example (N2–N1) represented in the matrix above.
4. If the matrix cell has zero value, then both the nodes have the same scores; that means that both the nodes have similar health, and connection strength is high.
5. $H^+ \rightarrow$ If the difference between node N1 and N2 is positive, then check the number of occurrences for the below conditions.
6. $H^- \rightarrow$ If the difference between node N1 and N2 is negative, then check the number of occurrences for the below conditions.
7. Based on the mean values the connection path is derived. For example, if the accumulated health value of (N1-N2) and (N2-N1) is zero, then there is a strong connection between both the sides (the connection is reciprocal).
8. If the connection is reciprocal and it persists for a long time, then there should be a real connection between the nodes and the impact of one node can be assumed to affect another connected node.
9. If the accumulated matrix value is >0, then there is a difference in connection strength from (N1-N2) and (N2-N1). The connection may be stronger on one side than other.
10. If the overall matrix is symmetric, that means each node of the graph is strongly connected and any change in one node affects all other nodes.

Determining the Connection Strength Between Nodes

To determine the connection strength between nodes, the time series data may be analyzed to find the distributions of the number of occurrences for all of the scenarios shown in Table 2.

If scenario 1, 2 and 4 has the most number of occurrences, then a strong connection may exist between N1 and N2, and this can be considered as an edge for constructing the paths. Scenario 3 may sometimes create a strong connection.

TABLE 2

| Scenario | N1 | N2 | No. of occurrences |
|----------|----|----|---------------------|
| 1 | Score changed | Score changed | N2 changes towards N1 then add 1 intensity point |
| 2 | Score not changed | Score changed | N1 changes towards N2 then add 1 |
| 3 | Score Not changed | Score Not changed | Add 1 |
| 4 | Score changed | Score not changed | Add 1 |
| 5 | Score changed | Score changed | N2 score changes away N1 and add 1 |
| 6 | Score not changed | Score changed | N1 score changes away N2 and add 1 |

Figure 8:
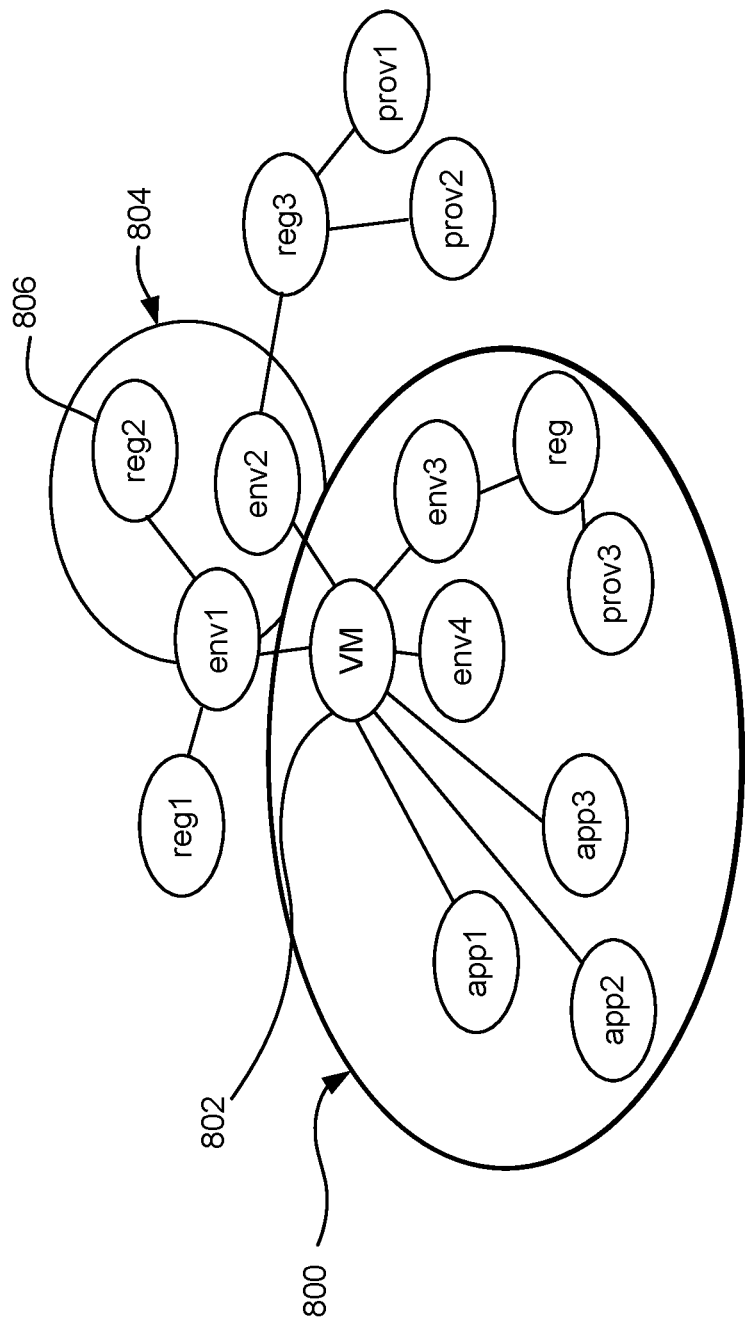
FIG. 8 is a graphical depiction of the territory over which entity VM 802 exerts influence, and the territory over which entity reg2 exerts influence, in accordance with one embodiment.

Identify the Territory of Business Service Entity Health Using Topology Propagation Model and Deriving and Learning Territory Models of Various Impactors The territory of each entity may be determined, where the territory represents the influence the entity has on other entities in the overall business service structure, e.g., the territory corresponds to a collection of entities which are impacted by the entity (impactor). FIG. 8 is a graphical depiction of the territory 800 over which entity VM 802 exerts influence, and the territory 804 over which entity reg2 806 exerts influence. This information can be used to determine how each entity influences other entities.

Regression Model for Node Propagation

Once all the relationships (connectivity) between nodes of an entity are identified, an impact propagation model of the graph can be built. For example, the propagation path between more distant nodes, e.g., N1 to N5, can be determined based on the stronger connection identified as in the section above. Such a model can be used to determine how a single event occurring for an entity at a different level propagates to the business service level.

Using the nodes represented in Table 1 (above), all possible paths may be determined for each node.

For example, for N1 as a destination, the combinations of nodes can be determined as follows. Set the length of the path from 3 to n−1 where n is the total number of entities.

Some sample combinations of nodes are presented below, where P represents a path and N represents a node:

$$P1 \rightarrow N2 \rightarrow N3 \rightarrow N4 \rightarrow N5 \rightarrow N1$$

$$P2 \rightarrow N3 \rightarrow N2 \rightarrow N4 \rightarrow N5 \rightarrow N1$$

$$P3 \rightarrow N3 \rightarrow N4 \rightarrow N5 \rightarrow N2 \rightarrow N1$$

$$P4 \rightarrow N4 \rightarrow N2 \rightarrow N3 \rightarrow N2 \rightarrow N1$$

$$P5 \rightarrow N2 \rightarrow N3 \rightarrow N1$$

$$P6 \rightarrow N2 \rightarrow N3 \rightarrow N5 \rightarrow N1$$

$$P7 \rightarrow N5 \rightarrow N4 \rightarrow N1$$

$$P8 \rightarrow N2 \rightarrow N4 \rightarrow N5 \rightarrow N1$$

etc.

Algorithm for Identifying Propagation Path

Using the algorithm below, all possible propagation paths of any health score from 0-100 can be identified. If one wants to know the propagation path of any node with a given health score, the path can be identified using the following algorithm.

Loop through each of the nodes (e.g. N1 ... N20).
  Set the source and destination nodes (e.g. N1 and N2).
  Set the number of nodes in the node set (e.g. [3, 4, 5, ... 20]—node set length).
  Loop: Create node set by setting different combinations of nodes apart from source and destination nodes. (e.g. N1→N4→N5→N3→N20→N2).
  Loop: Check the connection strength between each pair of nodes in the set using Table 2.
  If the connection is strong then keep the pairs in the set, else break the chain and keep only the pairs having a strong connection until now. (e.g. N3→N20 connection is weak then we have node set as N1→N4→N5).
  Add the node set into list.

Once the paths are identified, each individual path is input into a multiple regression model to understand the influence of each entity in the node set.

The propagation path $p_i$ health status score is based on all nodes associated in the path (node set). This propagation path is modelled, allowing us to understand the weightage of each node in the path and using the model we can predict the propagation.

$$p_i = \eta_0 + \eta_1 n_1 + \eta_2 n_2 + \eta_3 n_3 + \ldots + \eta_n k_k \qquad \text{Equation 4}$$

The source of health data for different types of entities (resource, environment, application, region) may be from external performance tools, or can be calculated from the metrics itself using techniques that would become apparent to one skilled in the art after reading the present disclosure.

For example, alerts, logs and incidents provide a good amount of health data for resources, applications, environments, etc.

Entity Health

Entity health can be retrieved from logs and alerts. Examples of different variations of resource health are presented below.
  RH—Entity Health Count—Number of logs metrics and alerts healthy for the period of time
  RW—Entity Warning Count—Number of logs metrics and alerts warning for the period of time
  RC—Entity Critical Count—Number of logs metrics and alerts critical for the period of time Metrics Health Examples of different variations of metrics health are presented below in Table 3.
  MH—Metrics Health Count—There is no abnormality detected in metrics data
  MW—Metrics Warning Count—There is a detectable variation seen in the metric data
  MC—Metrics Critical Count—Abnormal Metrics Data

TABLE 3

|  | R1 Healthy Count | | | | R1 Warning Count | | | | R1 Critical Count | | | |
| --- | --- | --- | --- | --- | --- | --- | --- | --- | --- | --- | --- | --- |
| Metrics Name | RH | MH | MW | MC | RW | MH | MW | MC | RC | MH | MW | MC |
| M1 (CPUutilization) | 1500 | 1400 | 50 | 50 | 500 | 90 | 300 | 10 | 160 | 2 | 124 | 34 |
| M2 (Memory Utilization) | 1100 | 1100 | 0 | 0 | 560 | 30 | 520 | 10 | 500 | 400 | 50 | 50 |
| M3 (S3 delete actions) | 100 | 40 | 460 | 300 | 1000 | 100 | 200 | 800 | 960 | 20 | 40 | 900 |

Figure 11:
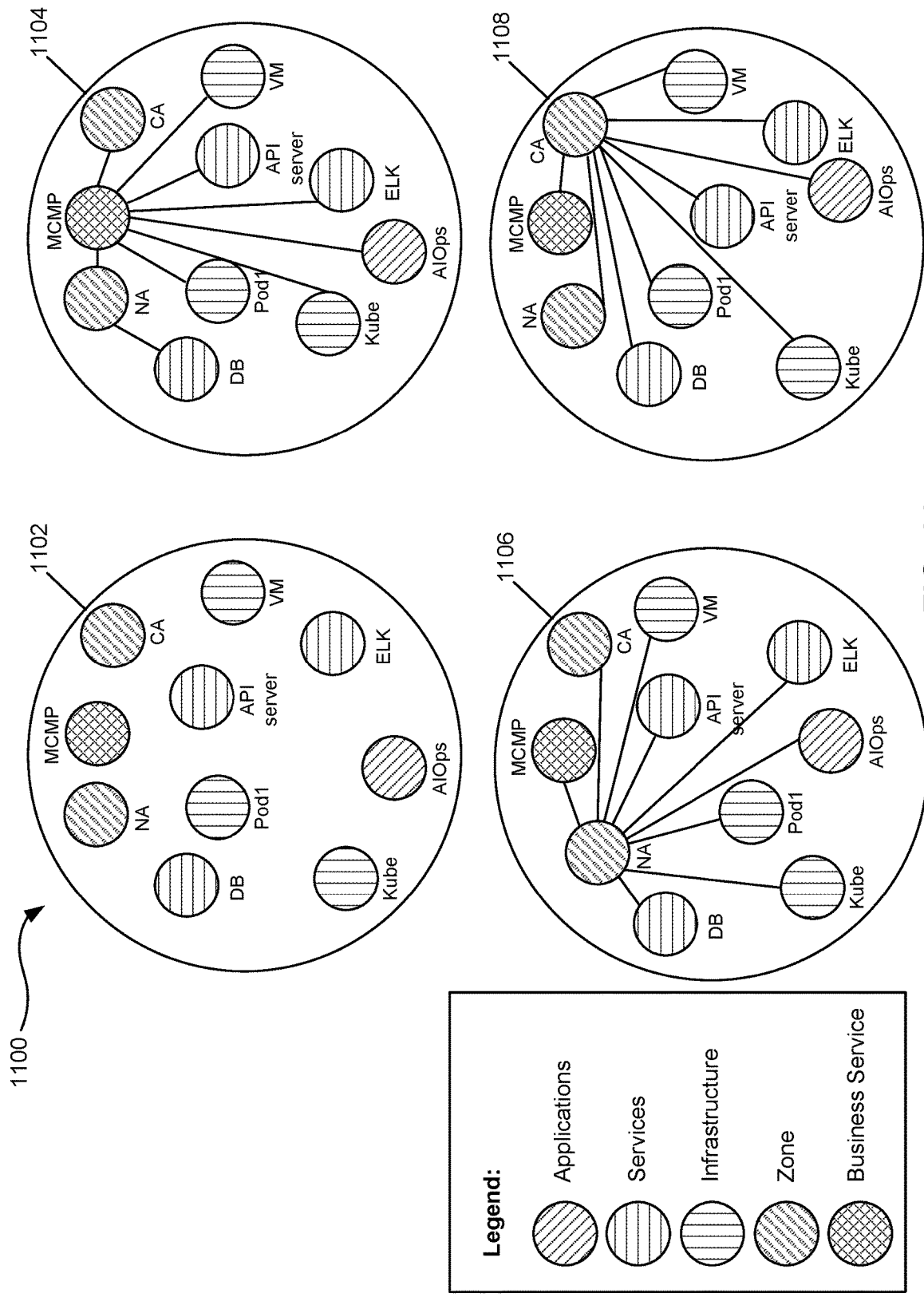
FIG. 11 is a graphical representation of a sequence for identifying the paths between nodes, in accordance with one embodiment.

FIG. 11 graphically depicts a potential sequence 1100 for identifying the paths between nodes. As shown, the business service entities with health scores are identified at 1102. At 1104, the edges between the business service to all other nodes are set up. At 1106, the edges between zone NA and all other nodes are set up. At 1108, the edges between zone CA and all other nodes are set up. At 1110, the edges between application AIOps and all other nodes are set up. At 1112, the edges between service API and all other nodes is set up. At 1114, the edges between intra resource Pod1 to all other nodes is set up. At 1116, the edges between service ELK to all other nodes is set up.

Entity Network Model Based on Multiple Pertinences

Each Node in a graph can be assessed using the below three pertinences:
  1. Critical state
  2. Warning state
  3. Healthy State An entity (e.g. resource) network model may be created using historical data (e.g. 90 days (including multiple updates on each pertinence per day)). The below three network models are created based on the pertinences for the metrics:
  1. Healthy resource network model
  2. Warning resource network Model
  3. Critical Resource network Model For example, assume a resource R1 has three metrics connected. These metrics are the data collected from the past 90 days.

An exemplary calculation of the health of resource M1 is as follows:

$$\text{Health Score} \to 1400/1500 * 100 = 93\%$$

$$\text{Warning Score} \to 300/500 * 100 = 60\%$$

$$\text{Critical Score} \to 34/160 * 100 = 21\%$$

This may be the accumulated health score for the past n days of any resource with respect to its associated metrics based on specific pertinence such as critical, warning and healthy.

Any number of pertinence may be added to any resource with respect to any aspects like health, security, performance, availability, responsiveness, etc.

The health score calculated is used to build a path based on the pertinence. The following models may be identified for any instance of time.
  1. Critical Model
    a. Path that holds entities that have high critical scores against RH
  2. Warning Model
    a. Path that holds entities that have high warning scores against RW
  3. Healthy Model
    a. Path that holds entities that have high healthy scores against RH 4. Instant Model (at any instant of time what is the combination of all the above paths values)
   a. Path that holds permutation combination of healthy, warning and critical score of the node
      i. For example, M1 is the metric, and it has M1H, M1 W, M1C scores
      ii. There is path that has M1 with M1H and M1 has M1 W and M1 has M1C—total 3 paths generated that has M1 in it.
   b. Path that holds permutation combination of healthy, warning and critical score of the node These models are helpful to understand the pattern of impact path of each entity level as it pertains to the whole business service level.

Pertinence Graphs

For example, if the resource M1 has 3 associated metrics, then the following paths with edges have pertinence impact. All the variations of the paths may be computed, as follows:
1. M1H, M2H, M3H with respect to RH, RW, RC
2. M1H, M2H, M3 W with respect to RH, RW, RC
3. M1H, M2H, M3C with respect to RH, RW, RC
4. M1H, M2 W, M3H with respect to RH, RW, RC
5. M1H, M2C, M3H with respect to RH, RW, RC
6. M1H, M2 W, M3 W with respect to RH, RW, RC
7. M1H, M2C, M3C with respect to RH, RW, RC
8. Etc.

Figure 12:
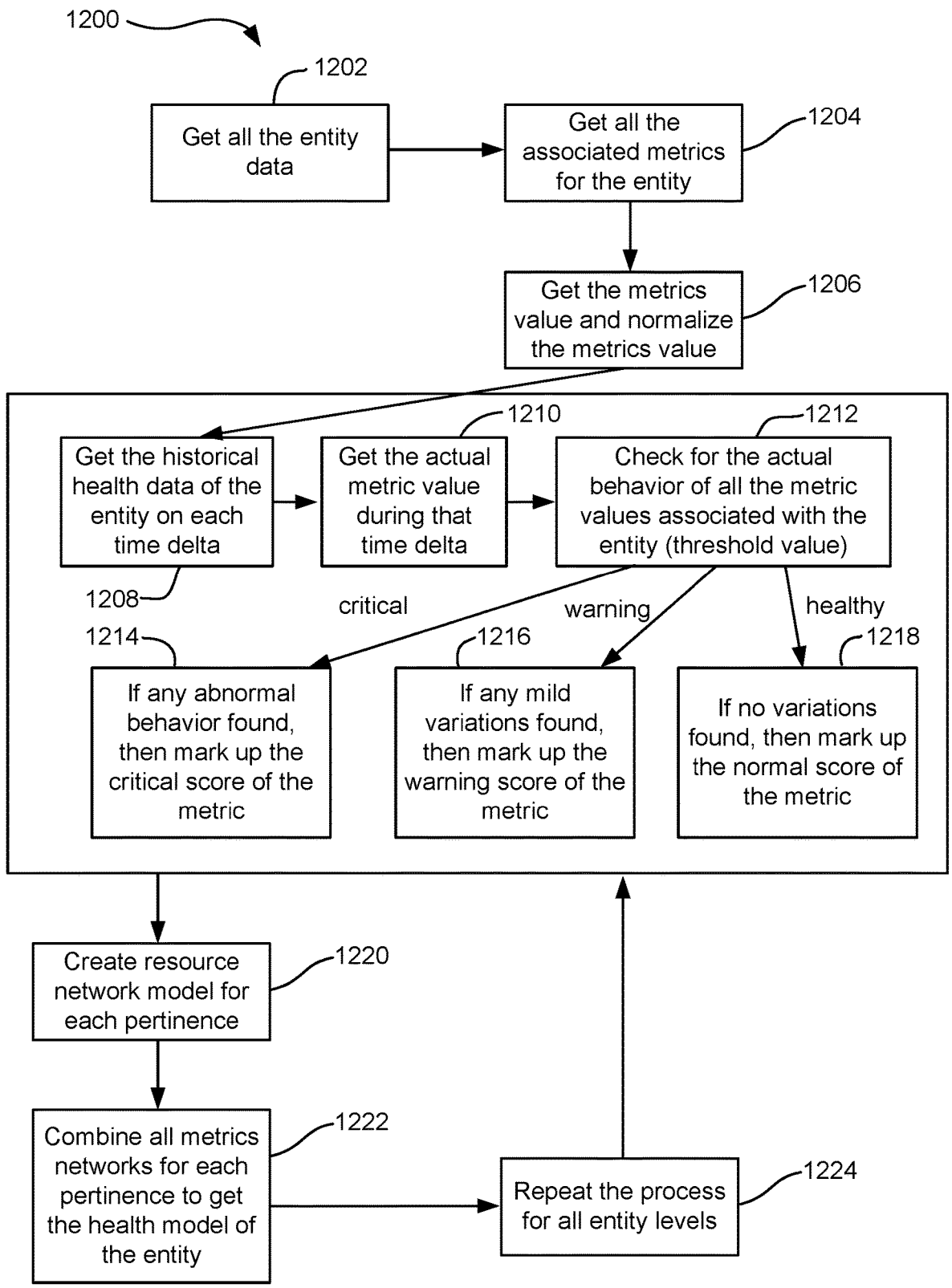
FIG. 12 is a flowchart of a method, in accordance with one embodiment.

Now referring to FIG. 12 a flowchart of a method 1200 is shown, according to one embodiment. The method 1200 may be performed in accordance with the present invention in any of the environments depicted in FIGS. 1-11, among others, in various embodiments. Of course, more or fewer operations than those specifically described in FIG. 12 may be included in method 1200, as would be understood by one of skill in the art upon reading the present descriptions.

Each of the steps of the method 1200 may be performed by any suitable component of the operating environment. For example, in various embodiments, the method 1200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 12, method 1200 may initiate with operation 1202, where data about the entity is retrieved, e.g., from the data lake.

The associated metrics are extracted from the data in operation 1204. The metric values can be of any type, such as bytes, count, percentage, Boolean, etc.

In operation 1206, the various metrics are analyzed, e.g., loop thorough each metric, and a metric value is determined for each metric based on the analysis. Each metric value is normalized, e.g., to a percentage. For example, based on the historical data, the maximum and minimum metric value is known. Using that, the percentage of the metric can be found.

In operation 1208, the historical health data of the entity on each time delta is obtained.

In operation 1210, the actual metric values during that time delta are obtained.

In operation 1212, the actual behavior of all the metric values associated with the entity are checked.

If any abnormal behavior is found, then the score of the metric can be marked as critical in operation 1214. If any mild variations are found, then the score of the metric can be marked as warning in operation 1216. If no variations are found, then the score of the metric can be marked as healthy in operation 1218.

Figure 13:
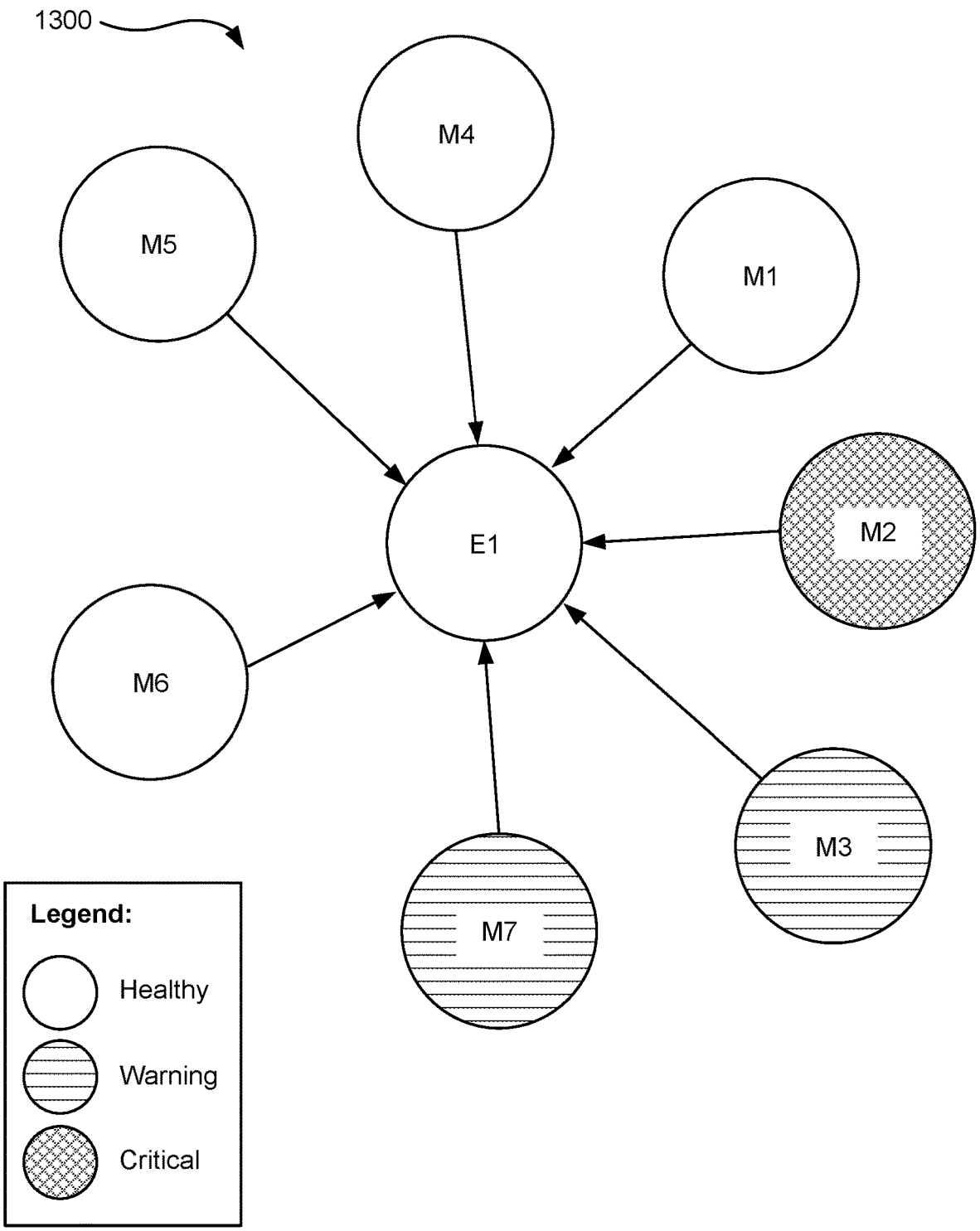
FIG. 13 is a graphical representation of a metric network for a resource constructed during the method of FIG. 12.

As shown in FIG. 13, a resultant metric network 1300 for the resource E1 can be constructed. Multiple health pertinence can be added here for each metric M, with all variations.

Referring again to FIG. 12, a resource network model for each pertinence is created in operation 1220.

In operation 1222, all of the metrics networks for each pertinence are combined to acquire the health model of the entity. For example, the health score of the entity can be calculated by considering the normalized metric value of each of the metrics, e.g., the sum of the metric values, the average of the metric values, etc.

In operation 1224, the process is repeated for all of the entity levels.

Entity Level Impactors Algorithm

An exemplary entity level impactors algorithm includes:
1. Check the current status of the entity (R) health using alerts.
2. Create a subset of the graph for each entity level (graph for critical, warning and healthy), as mentioned above in the section entitled "Pertinence Graphs."
3. Obtain the eigen value for each pertinence graph.
   a. Eigen value gives the highest impactful entity in the graph.
4. Obtain the details of the entity that has a high eigen value on critical, healthy and warning pertinence.
5. Obtain the eigen value for the overall graph for the entity with all pertinence values.
6. If the eigen value centrality of the overall graph is a match with any of the pertinence of the entity, then use the pertinence level graph as a high impactful subset of the graph.
7. All the eigen values (over a period of time) for each type of graph and its impact score are stored and assessed for learning using Graph Neural Network (GNN).

Figure 14:
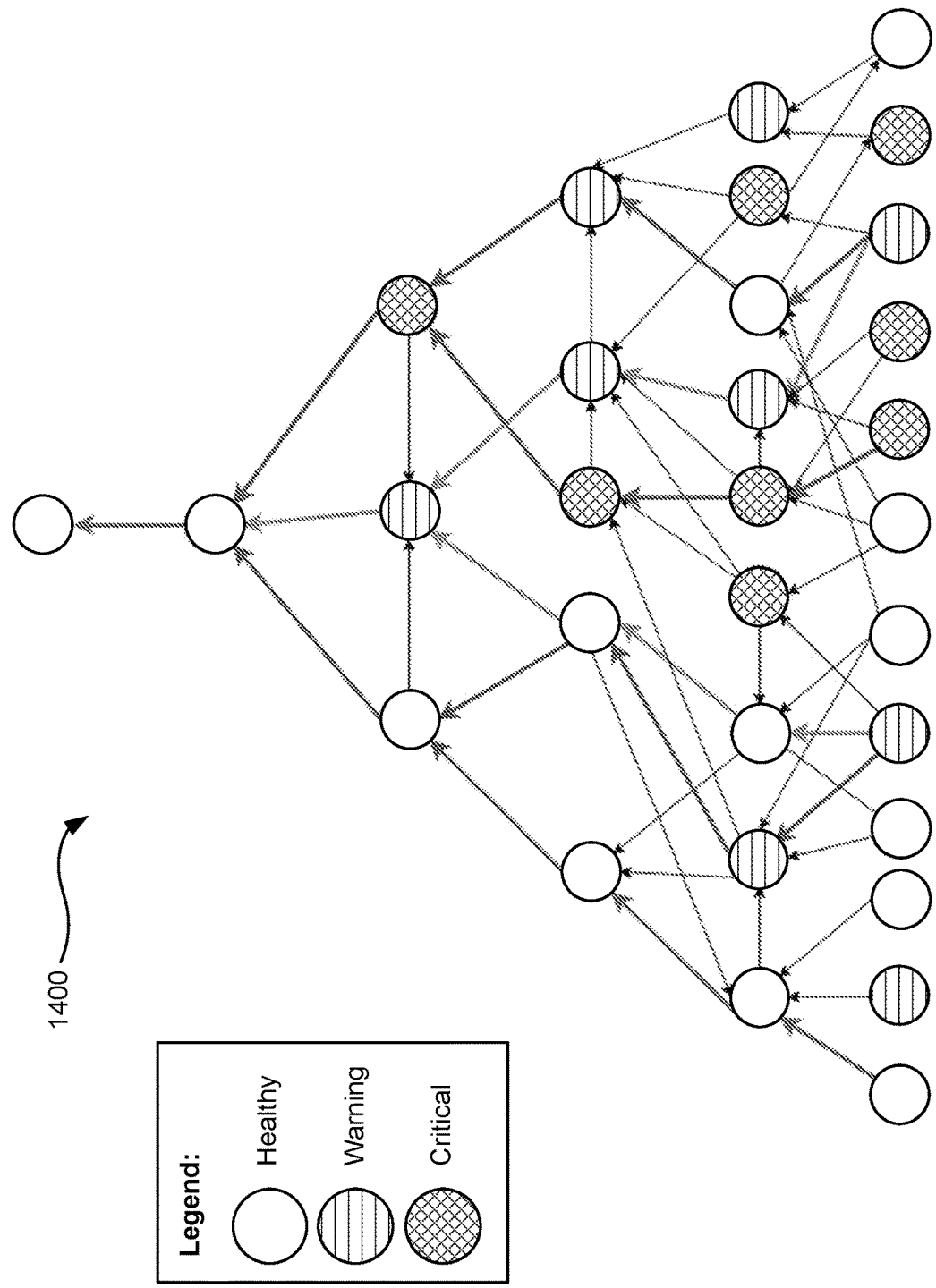
FIG. 14 is a graph illustrating impactor paths, in accordance with one embodiment.

FIG. 14 illustrates an exemplary graph 1400 illustrating impactor paths, where a thicker arrow corresponds to a higher impact.

Benefits and Practical Applications

The foregoing methodologies provide many practical applications. For example, as noted above, by determining the health of entities in consideration of the health of other entities linked thereto, and in response, resolving those health issues, the overall functioning of the business service is improved because all entities in the business service have an effect on the overall health of the business service. Accordingly, the foregoing methodologies improve the functionality, reliability, effectiveness, and efficiency of the business service.

Likewise, rather than simply determining a health of individual entities, by considering the interconnections between entities located on different levels when determining entity health, the impact that one unhealthy entity has on the health of other entities, and indeed the business service overall, is determinable, and able to be resolved, thereby improving the health of the overall business service.

Moreover, by improving the health of the overall business service, as well as its underlying entities, the functioning of the computer(s) running the entities, as well as hardware entities themselves, are improved. For example, if an entity is unhealthy because it is consuming excessive CPU cycles and/or memory of the computer it is running on, diagnosis and resolution of the health issue results in improvement of operation of the computer. Similarly, where an otherwise healthy entity is unable to run efficiently on a computer because an impactor entity is unhealthy and exerting an influence on the entity that diminishes the entity's health and/or efficiency, the foregoing methodologies are able to diagnose the unhealthy impactor entity, enabling repair of the unhealthy impactor entity and diminution of its unhealthy impact on the other entity. In turn, because the entity is now healthier, the operation of the computer running the entity is improved. For example, where the impactor entity is unhealthy and thus takes more time than it should to provide data to the other entity, the other entity must wait for the arrival of the data. Meanwhile, the entity is consuming system resources while waiting for the unhealthy entity to deliver the data. Once the unhealthy entity is healthy again, or replaced, the data comes faster and the other entity can finish its task and release system resources for other tasks. The net result is that the computer runs more efficiently. Likewise, the computer running the previously unhealthy entity (whether the same or a different computer) will also run more efficiently because the previously-unhealthy-but-now-healthy entity is able to complete its tasks of sending the data more quickly and then releasing resources for other tasks.

The foregoing methodologies, while rooted in system diagnosis, convey an improvement in another technology, namely business service operation, by improving the functionality, reliability, effectiveness, and efficiency of the business service.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
  receiving, by a computer, a taxonomy specifying entities of a business service and levels of said entities;
  collecting, by the computer, time series data about the entities;
  storing, by the computer, the time series data;
  identifying, by the computer, impactor propagation paths between entities;
  identifying, by the computer, a territory of a health impact of each entity;
  computing, by the computer, a health score for each of the entities considering impacts on a health of the entity by at least one other entity based on the data, the propagation paths, and the territories of the entities;
  outputting, by the computer, at least one of the health scores;
  detecting, by the computer, an unhealthy entity based on the output health scores; and
  initiating, by the computer, a process for improving a health of the unhealthy entity.

2. The computer-implemented method of claim 1, wherein the time series data is stored in a data lake, and wherein the method further comprises:
  normalizing the time series data; and
  performing analytics and machine learning processing on the normalized data for identifying the impactor propagation paths between entities and identifying the territory of the health impact of each entity.

3. The computer-implemented method of claim 1, further comprising deriving, using the time series data, a propagation model for each entity with respect to time including predicting a pattern of the impact of a particular entity over time on other entities.

4. The computer-implemented method of claim 1, further comprising computing an overall health score for the business service based on the health scores.

5. The computer-implemented method of claim 1, wherein at least some of the time series data corresponds to attributes associated with the entities, wherein the attributes are weighted.

6. The computer-implemented method of claim 5, wherein the attributes include metrics selected from the group consisting of CPU utilization, memory utilization, and available storage.

7. A computer program product for determining at least one health score for a business service, the computer program product comprising a computer readable storage medium having program instructions embodied therewith, the program instructions executable by a computer to cause the computer to perform a method comprising:
  receiving, by the computer, a taxonomy specifying entities of a business service and levels of said entities;
  collecting, by the computer, time series data about the entities;
  storing, by the computer, the time series data;
  identifying, by the computer, impactor propagation paths between entities;
  identifying, by the computer, a territory of a health impact of each entity;
  computing, by the computer, a health score for each of the entities considering impacts on a health of the entity by at least one other entity based on the data, the propagation paths, and the territories of the entities;
  outputting, by the computer, at least one of the health scores;
  detecting an unhealthy entity based on the outputting the at least one of the health scores; and
  causing a health of the unhealthy entity to be improved.

8. The computer program product of claim 7, wherein the time series data is stored in a data lake, and wherein the method further comprises:
  normalizing the time series data; and
  performing analytics and machine learning processing on the normalized data for identifying the impactor propagation paths between entities and identifying the territory of the health impact of each entity.

9. The computer program product of claim 7, wherein the method further comprises deriving, using the time series data, a propagation model for each entity with respect to time including predicting a pattern of the impact of a particular entity over time on other entities.

10. The computer program product of claim 7, wherein the method further comprises computing an overall health score for the business service based on the health scores.

11. The computer program product of claim 7, wherein at least some of the time series data corresponds to attributes associated with the entities, wherein the attributes are weighted.

12. The computer program product of claim 11, wherein the attributes include metrics selected from the group consisting of CPU utilization, memory utilization, and available storage.

13. A system, comprising:
a hardware processor; and
logic integrated with the processor, executable by the processor, or integrated with and executable by the processor, the logic being configured to:
receive a taxonomy specifying entities of a business service and levels of said entities;
collect time series data about the entities;
store the time series data;
identify impactor propagation paths between entities;
identify a territory of a health impact of each entity;
compute a health score for each of the entities considering impacts on a health of the entity by at least one other entity based on the data, the propagation paths, and the territories of the entities;
output at least one of the health scores;
detecting an unhealthy entity based on the outputting the at least one of the health scores; and
causing a health of the unhealthy entity to be improved.

14. The system of claim 13, wherein the time series data is stored in a data lake, and wherein the logic is further configured to:
normalize the time series data; and
perform analytics and machine learning processing on the normalized data for identifying the impactor propagation paths between entities and identifying the territory of the health impact of each entity.

15. The system of claim 13, wherein the logic is further configured to derive, using the time series data, a propagation model for each entity with respect to time including predicting a pattern of the impact of a particular entity over time on other entities.

16. The system of claim 13, wherein the logic is further configured to compute an overall health score for the business service based on the health scores.

17. The system of claim 13, wherein at least some of the time series data corresponds to attributes associated with the entities, wherein the attributes are weighted.

\* \* \* \* \*